United States Patent [19]
Guichet

[11] 3,769,708
[45] Nov. 6, 1973

[54] AVERAGE ARTICULATOR

[76] Inventor: Niles F. Guichet, 3200 Olympia Pl., Anaheim, Calif.

[22] Filed: Sept. 27, 1971

[21] Appl. No.: 184,041

[52] U.S. Cl. .................................................. 32/32
[51] Int. Cl. ............................................ A61c 11/00
[58] Field of Search ........................................ 32/32

[56] References Cited
UNITED STATES PATENTS

| | | | |
|---|---|---|---|
| 3,159,915 | 12/1964 | Bev et al. | 32/22 |
| 3,206,852 | 9/1965 | Swanson | 32/22 |
| 3,478,431 | 11/1969 | DePietro | 32/22 |

*Primary Examiner*—Robert Peshock
*Attorney*—Robert E. Strauss

[57] ABSTRACT

An articulator is described for movement of dental casts along pathways of average anatomical dimensions. The articulator is provided with a condyle-fossa hinged connection that has fixed or unadjustable medial and superior wall guides with posterior wall guides which are adjustable between two positions about a vertical axis through the condyle. In a preferred embodiment, replaceable inserts are used as superior and/or medial wall guides and several such inserts that duplicate fossa guide surfaces are provided. The articulator is for use in the instruction of students or for other applications where the complex and delicate articulators which have multiple adjustments are not necessary. The articulator is preferably provided in combination with a series of dental casts which present typical dental problems as an instructional study aid.

14 Claims, 8 Drawing Figures

PATENTED NOV 6 1973 3,769,708

INVENTOR.
NILES F. GUICHET
BY Robert Evans
ATTORNEY

PATENTED NOV 6 1973  3,769,708

INVENTOR.
NILES F. GUICHET
BY

ATTORNEY

AVERAGE ARTICULATOR

DESCRIPTION OF THE INVENTION

This invention relates to dental equipment and, in particular relates to dental articulators which are employed to simulate mandible movements.

The present day dental aritculator is quite a complex mechanical device with incisal pin and condyle-fossa guides that can be set at many angles to permit simulation of mandibular movement. These articulators are delicate instruments with very limited manufacturing tolerances so that the various guide surfaces can be set with a high degree of precision.

There are, however, occasions when a less complex and costly device is satisfactory. Frequently, a dentist prepares a simple appliance such as a single crown, etc., which doesn't require the sophisticated movements of a dental articulator. Students also need a simple device to study tooth interrelationships before they have acquired the skill and knowledge needed to operate a complex articulator.

In many schools it is also a practice to use dental casts with replaceable teeth as a study aid to demonstrate dental problems. These casts, however, are not designed for use with a particular articulator and the maximum instructional value of the aids is not achieved.

It is an object of this invention to provide an articulator which is simple and inexpensive to manufacture.

It is also an object of this invention to provide an articulator with fixed guides that permit duplication of average anatomical movements of the mandible.

It is a further object of this invention to provide a limited adjustability in such an articulator to increase its versility.

It is an additional object of this invention to provide such an articulator with replaceable and precontoured guides which permit duplication of a variety of typical anatomical movements.

It is a still further object of this invention to provide a series of dental casts which will demonstrate tooth interrelationships and a series of problems in such interrelationships.

Other and related objects will be apparent from the following description of the invention.

The aforestated objects are achieved by this invention which employs fossa guide members on one frame which are in bearing relationship to condylar members carried by the other frame and which support fixed and non-adjustable superior and medial wall guides that have bearing surfaces which present average anatomical pathways to the condylar members. The fossa guide members also have posterior walls which have a limited adjustability about a vertical axis through the condylar members to permit simulation of different intercondylar distances. In preferred embodiments, the superior and/or medial wall guides are removeable inserts and serveral interchangeable guides are used, each providing a different, but typical, anatomical pathway.

The latter of the aforestated objects is achieved by a plurality of dental casts with preset tooth problems and with means permitting their removeable mounting in the articulator.

The invention will now be described with reference to the figures, of which:

Figure 1:
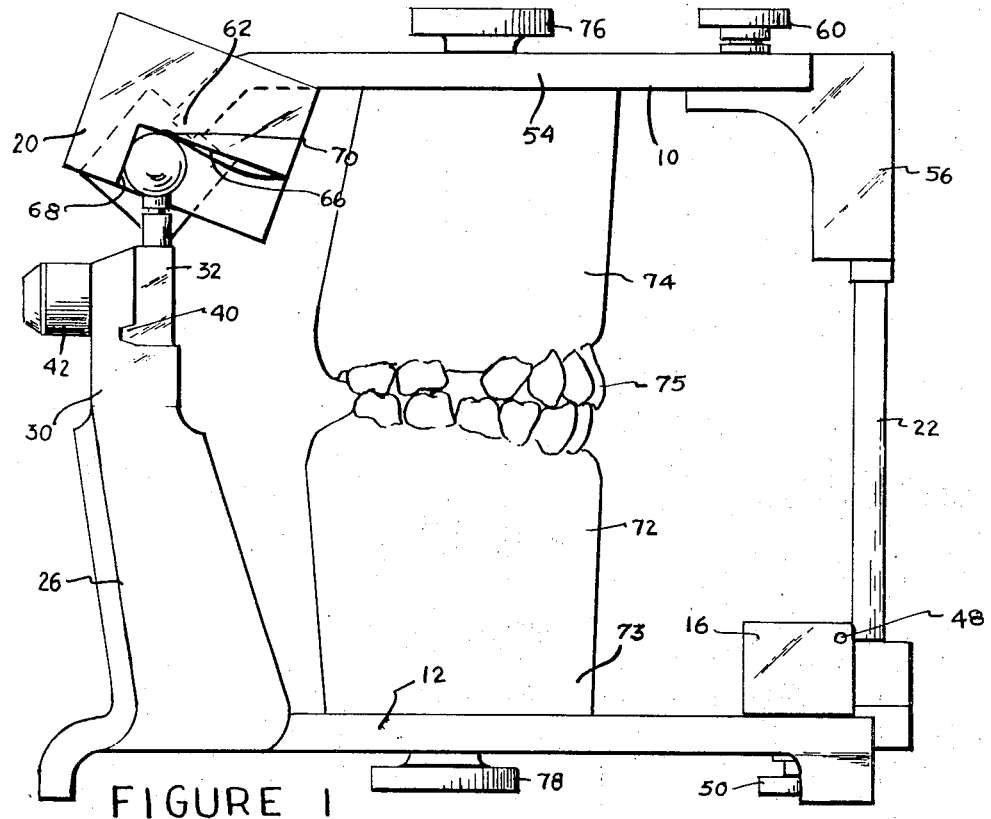
FIGS. 1 and 2 illustrate the side and front, respectively of the average articulator.
Figure 2:
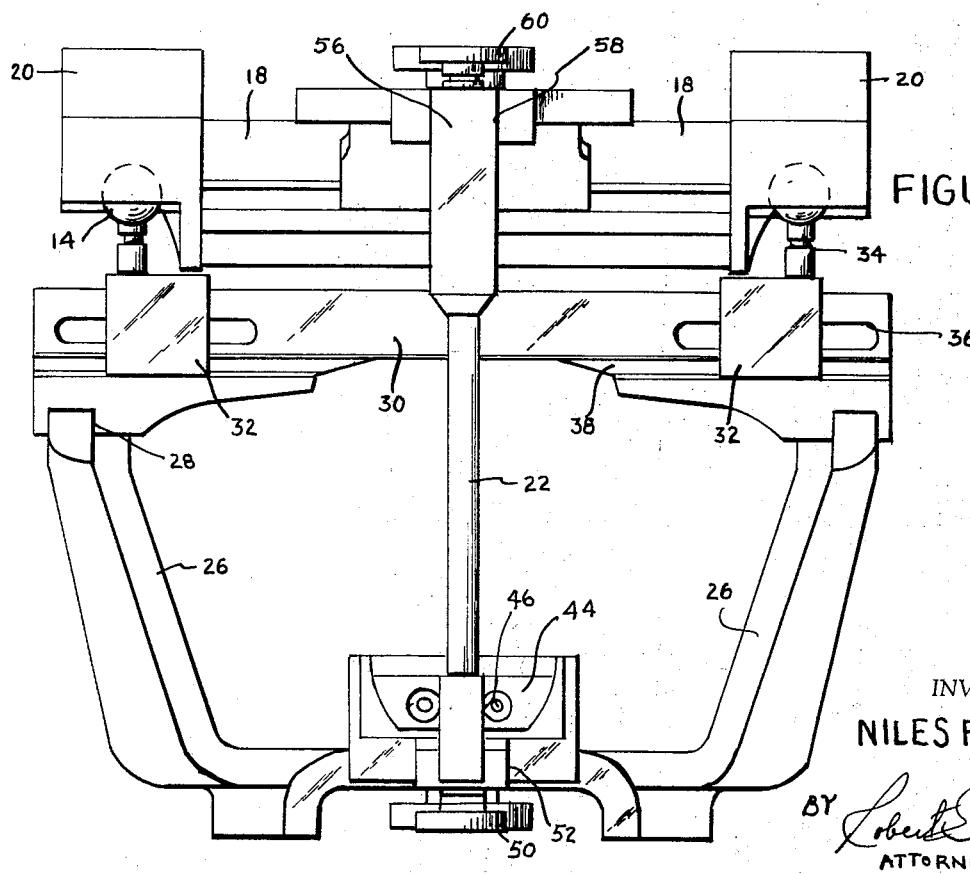

Referring now to FIGS. 1 and 2, the articulator is shown as comprising upper frame 10 and lower frame 22. It is preferred that the articulator guides of this invention be provided in one or more modules which are interchangeable with components of the articulator shown in my prior U.S. Pat. 3,590,487 issued July 6, 1971. When such modules are used, a student can be furnished with the simplified articulator of this invention and, when he has advanced and acquired greater knowledge and skill, modules having the fixed guides can be replaced with the precision fossa and incisal modules which have multiple adjustment guides such as disclosed in my prior patent.

The lower frame member 12 has condylar members 14 which are supported at each side of the posterior end of this member and an incisal guide member 16 which is supported on the longitudinal axis at the anterior end of the frame. The frame 10 has lateral wing members 18 which project towards the condylar members 14 and support fossa guide members at either side of this member and above and in bearing relationship to the condylar members. The upper frame 10 also carries, at its anterior end, an incisal pin 22 which is in bearing relationship with the incisal pin guide member 16 of the lower frame.

As previously mentioned, the invention is embodied in modular units to be employed with the various modules of the articulator described in my aforementioned patent. FIGS. 1 and 2 illustrate such modular embodiment of the invention, and the lower frame 12 is shown as the complete frame used in the more complex articulator that is useful for a variety of complex and intricate adjustments of the fossa guide members. This lower frame member comprises a generally triangular shaped base which has upright legs 26 at either side of its posterior end. The upper ends of these legs are engaged in grooves 28 of crossbar 30 which extends across the posterior of the instrument and supports blocks 32 at either end thereof. Condyle members 14 are supported on shafts 34 which are carried on the top surface of blocks 32.

As illustrated, crossbar 30 has grooves 36 which extend through the crossbar as well as grooves 38. The grooves 38 form a keyway or slide for tongue 40 which is on the rear face of blocks 32. The blocks also carry studs which extend through grooves 36 and are engaged by lock nuts 42 at the rear of the instrument. This permits variation in the intercondylar spacing of members 14. As employed in this invention, however, the condylar members 14 are not adjustable since the fossa guide members 20 are fixedly supported to crossbar 18 of the upper frame 10. As described hereinafter, crossbar 30 with condyle support blocks 32 can be replaced with a simple non-adjustable and replaceable condyle module for the articulator. As illustrated in FIGS. 1 and 2, however, the invention is applied to the base of an articulator such as that described in my prior patent.

The anterior of the lower frame 12 carries an incisal guide member 16 which has an incisal guide table having wings 44 which can be rotated about axis 46 to provide a lateral inclined incisal guide surface. In addition, the table can be rotated about axis 48 to provide a longitudinally inclined guide surface. Again, as previously mentioned, the incisal guide member with the various adjustable guide surfaces need not be employed with this invention and is shown only as part of the lower frame assembly of the articulator of my prior invention. As described hereinafter, this table shown in FIGS. 1 and 2 can be replaced with a simple table cast of metal or plastic which has a precontoured guide surface. This is the preferred embodiment for use with the upper frame member which supports fossa guide members 20 that have fixed or non-adjustable guide surfaces. The incisal table is secured to the anterior of the articulator by thumb screw 50 and fits into groove 52 at the anterior of frame 12

The upper frame 10 comprises a longitudinal member 54 which supports at its anterior end incisal pin bracket 56. Secured to the lower face of bracket 56 is the incisal pin 22. The anterior of member 54 is grooved at 58 and bracket 56 fits into this groove. The lower surface of bracket is drilled and tapped and thumb screw 60 projects into the tap so that the screw can be tightened to lock bracket 56 to member 54. The bracket 56 and incisal pin are a replaceable module and can be replaced with an incisal pin assembly which permits variation in the angular setting of the pin as described in my prior patent.

The posterior of longitudinal member 54 has a tongue 62 which fits into a groove cut into the upper face of crossbar 18. Several screws are placed in bores through member 18 and project into tapped bores in the face of tongue 62 to lock the assembly of the crossbar and longitudinal member 54. The fossa guide members 20 are supported at the outboard ends of crossbar and the fossa guide members and crossbar are simply cast as an integral unit of material such as platic, e.g., polycarbonate, nylon, etc., or cast from aluminum or magnesium or their alloys. The fossa guide members 20 are in the shape of blocks which have their outer, lower and forward corner removed to define fossa guide surfaces. These fossa guide surfaces comprise medial wall guide surface 64, superior wall guide surface 66 and posterior wall guide surface 68. When the upper frame 10 rests on lower frame 12, these guide surfaces are in bearing relationship with the condyles 14 carried on the lower frame as illustrated in FIGS. 1 and 2. The anterior of the upper frame 10 is supported by incisal pin 22 which is in bearing relationship to the guide surfaces of incisal guide member 16.

The superior guide surface 64 is shown in FIG. 1 as having a precontoured surface and presents a generally convex surface to condyle 14. This shape is a precontoured shape which corresponds to the average or typical anatomical pathway and will be satisfactory for many cases studied or worked with the instrument. When the frame 10 is in its centric orientation, as shown in FIGS. 1 and 2, condyle 14 fits into a minor depression or recess in the superior wall. This is shown as depression 70 in FIG. 1. These depressions serve to orient the upper frame and function as detents for the upper frame in the centric position.

The medial wall guide surface 64 is also a fixed, precontoured surface. This is shown as surface 64. The shape of this wall is described in greater detail with reference to FIGS. 3 to 6. The posterior wall surface 68 can be also fixed and non-adjustable as shown in FIGS. 1 and 2. Preferably, however, this guide surface is adjustable between two positions about a vertical axis passing through condyle 14. The first of these positions comprises an angular setting of about 10° forward and the second setting comprises an angle of about 30° rearward, the angles being defined with regard to the transverse horizontal axis passing through the condyles 14. This adjustment thereby provides a posterior wall that permits a simulated movement of the members out and back or out and forward when the upper frame is moved in simulted mandibular pathways.

The illustrated articulator employs a rotatable posterior wall. Alternatively, the posterior wall could have means for the removeable attachment of inserts such as those described with regard to the posterior and medial walls. Such inserts would provide the two positions indicated herein to simulate different intercondylar distances as well as for other typical or atypical movements.

Supported at about the mid-portion of each of frames 10 and 12 are dental casts 72 and 74. When dental appliances are to be fabricated, the casts of course are prepared from the patient's teeth in the normal manner. When the articulator is used as a teaching or demonstration aid, it is preferably combined with several sets of dental casts which have cast teeth 75 and a base 73 which can be mounted directly onto the articulator frames as shown. The casts employed have chewing and occluding surfaces that are in harmony or in a deliberate discordancy with the preset articulator fossa-condyle and incisal pin guide surfaces. In this manner, the proper, i.e., interference-free,cusp-fossa relationship can be demonstrated as well as the problems and reasons therefor which occur when interference is present in this relationship. An example of a precast dental problem which can be provided in such a set of instructional casts is shown by the missing bicuspid in cast 74. The casts 72 and 74 are secured to their respective frames by thumb screws 76 and 78, which are attached to locking studs that project through frames 10 and 12 into threaded engagement with bores in the faces of the casts.

Figure 3:
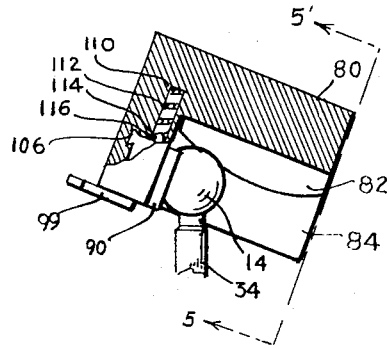
FIGS. 3 to 6 illustrate a fossa guide of the invention having a removeable fossa guide insert.
Figure 6:
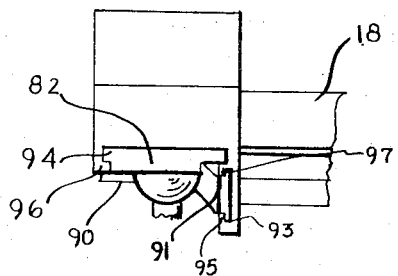
Figure 4:
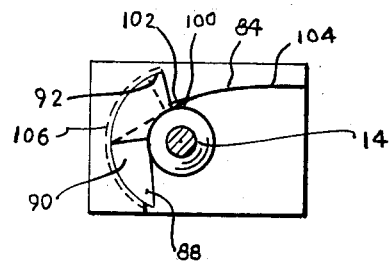
Figure 5:
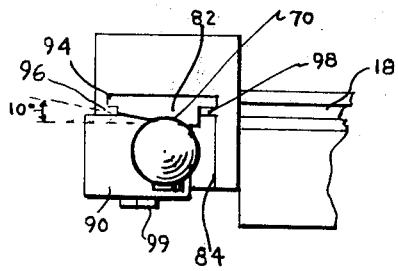
Figure 5:
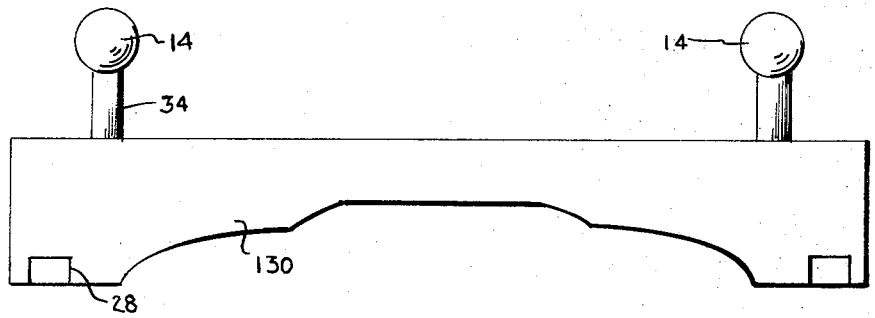

FIGS. 3 through 6 illustrated preferred fossa guide members, These members as previously mentioned can be cast on opposite ends of crossbar 18 which is removeably mounted on the longitudinal member 54 of upper frame 10. FIG. 3 illustrates a side view of the left fossa guide member. FIG. 4 is a view of the under surface of this member while FIG. 5 is a view of the same member along lines 5—5' of FIG. 3. FIG. 6 shows the details of a medial wall insert and mounting means that can be used. Condyle 14 is shown on post 34 in bearing relationship to the fossa guide surfaces of block 80. The block 80 supports a removeable insert 82 that provides the superior wall guide surface for condyle 14. The medial wall guide surface 84 can be a precast wall of a predetermined contour or, preferably, can support a replaceable insert as shown in FIG. 6. The posterior wall guide 88 is at the front face of block 90 which is rotatable in groove 92 about a vertical axis through condyle 14.

The contour of the fixed medial wall guide is best shown in FIG. 4. The medial wall is not in bearing relationship with condyle 14 when the frames are in centric orientation. Instead, there is a slight gap 100 or about 0.2 to 0.4 millimeters to provide means to permit an immediate lateral shifting of the members. The medial wall guide than has a precontoured early side shift 102 which is at a greater angle to the longitudinal centerline through the condyle than the distributed sideshift which appears as the last leg 104 of this compound curvature to guide surface 84. In a typical fossa example, the progressive side shift leg 104 has an angle to the longitudinal centerline of about 12 degrees. Various precontoured wall guides can be used wherein the wall surface retracts medially to provide varied paths for the timed Bennett side shift, e.g., an early side shift wherein the surface retracts sharply in the forward direction, a straight side shift wherein the surface retracts along a predetermined angle to provide a straight path for the condylar member or a distributed side shift wherein the surface retracts non-linearly, but at a lesser angle initially than in the early side shift contour.

FIG. 5 shows the means for mounting the removeable superior wall inserts. This comprises a groove 94 in the upper surface of the underside of block 80. The groove 94 provides lips 96 and shoulder 98 which serve to retain the superior wall insert 82 in place in block 80. The superior wall insert 82 has the centric depression, i.e., a dimple, described as element 70 in FIG. 1 which serves as a centric detent for the upper frame 10. The detent can be used on any articulator and offers its greatest advantage with articulators that have means to permit their immediate lateral shifting such as those described and claimed in my aforesaid prior patent. With such articulators, a convenient means to align the frames in their centric orientation, as shown in FIGS. 1 and 2, is desired and the depressions in the superior wall of the fossa elements shown herein serves this purpose. The superior wall surface 82 can present a variety of precontoured surfaces in a series of removeable inserts. These can vary to provide a series of typical pathways. The superior wall insert also, preferably, has an upwardly inclined surface outboard of condyle 14. This incline is preferably at about 10 degrees to the transverse horizontal axis to provide an inclination of the superior wall which is slightly greater than that of typical superior walls, thereby insuring that no interference in the cusp-fossa fit will occur when an appliance fabricated on the articulator is seated in a patient's mouth.

A circular groove about condyle 14 is cut in the rear face of block 80 and block 90 is mounted therein. Means are provided for securing block 90 in groove 92. A circular dovetail groove 106 can be cut along the rear face of groove 92 and a lip with a dovetailed configuration can be provided on the rear surface of block 90 to mate with this dovetailed groove. The block 90 has the posterior wall bearing surface 88 which is in bearing relationship to condyle 14. This block is rotatable about a vertical axis thorugh the condyle between two positions as shown in FIG. 4. As shown, the forward position of the block is in dashed lines. The forward position of this block is at an angle of about ten degrees with the condyle axis passing through both condyles 14. The rearward position of this block is at an angle of about 25–30° with this axis so that the total variation between positions is about 35°–40°. Preferably detents are provided to lock block 90 in either of these positions. Such a detent is shown in FIG. 3 which comprises a bore 110 in the under face of groove 92 with a spring 112 positioned in this bore biasing against ball 114 that is placed in the bore. A washer 116 can be secured to lock ball 114 in its position in the bore 110. The upper face of block 90 can have a circular depression or seat for detent ball 114 in each of the two positions for block 90. A lever 99 can be provided on block 90 to permit movement of the block between the two positions.

As previously mentioned, the medial wall guide is preferably a replaceable insert so that any of a variety of inserts having guide surfaces of varied, precontoured shapes can be used. FIG. 6 shows a typical fossa unit which has a replaceable medial wall guide insert 91. The medial wall of block 80 is grooved at 93 to form lips 95 and 97. The insert 91 can be slipped into the groove and is retained in this position by the lips. A series of inserts can be used to vary the amount of immediate side shifting of the instrument by variation in gap 100 or to vary the progressive side shift by variation in the shape of leg 104; the latter elements being shown in FIG. 4.

Figure 7:
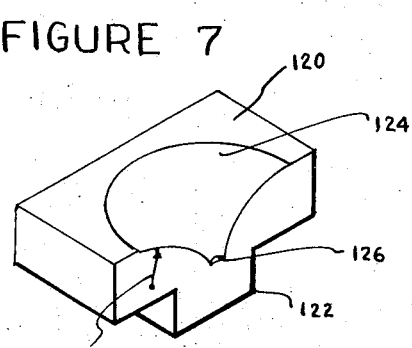
FIG. 7 illustrates an incisal table with fixed guide surfaces that can be used in the average articulator.

FIG. 7 illustrates the incisal table module which is used with this invention. The table comprises a block 120 which has a dependent lower tongue 122 for mounting in groove 52 of the lower frame 12 of the articulator shown in FIGS. 1 and 2. The block 120 also has a semi-circular recess molded into its face which has a bottom surface of a precontoured shape. At the center of this recess 124 is a small semi-circular recess 126 which has a depth of about 0.25 millimeters and a diameter adequate to provide a rest for the end of pin 22 shown in FIGS. 1 and 2. The side walls of depression 124 are formed with a circular arc having a radius of about 7/16 inch as shown at r. The cord of this arc has an angle with the horizontal which is preferably about 30 degrees.

Figure 8:
FIG. 8 illustrates a crossbar for use in the articulator.

FIG. 8 shows a crossbar 130 which can be used to replace crossbar 30 shown in FIGS. 1 and 2. This crossbar has condyles 14 supported on posts 34 which are fixedly positioned to the bar 130. The posts can be threaded and turned into threaded bores in bar 130. Alternatively, bar 130 can be cast of plastic in a manner similar to that described for bar 18 and posts 34 can be embedded in this bar during its molding.

The articulator of this invention provides a minimal degree of adjustability, yet it will be found to be entirely satisfactory for the aforementioned uses where the sophistication of a highly adjustable articulator is not needed. The use of the incisal pin guide 120 in combination with the limited adjustability fossa guides 20 will provide an articulator which simulates average mandibular movements and which, therefore, is entirely satisfactory for introductory dental courses and for simple dental work.

The adjustability of the rear fossa guide walls between forward and rearward inclinations accomplishes two purposes. Firstly, such adjustment illustrates and permits simulation of mandibular movements which often experience protrusion or retraction of a condyle rather than entirely lateral shifting. Secondly, the adjustability of the rear fossa guide wall permits elimination of adjustability of the spacing between condyles, i.e., in the intercondylar distance, while, nevertheless, illustrating and simulating the effect of variations in this distance. Despite the fact that the articulator of this invention has fossa elements 20 which are at fixed intercondylar distances and condyles 14 which are also at fixed distances (see FIG. 8) the effects of variation in intercondylar spacing are not lost.

When the mandible rotates about a condyle, e.g., the rotation about the left condyle during a left lateral excursion, and when this condyle retracts along the rear fossa guide because the latter is in its rearward inclination, the effect on the cusp-fossa relationship is comparable to such a lateral excursion on an instrument having a lesser intercondylar spacing. Similarly, if the condyle is advanced forward by the rear wall being in its forward inclination the effect on the cusp-fossa relationship is comparable to performing the lateral excursion on an instrument having a greater intercondylar spacing. The simple setting of the rear wall guide between its two positions, therefore, simulates the effect of varied intercondylar spacing without the necessity to provide means for adjustment of the intercondylar spacing between the condyles and between the fossa elements.

When the articulator is also furnished with the replaceable medial and superior wall guide inserts described herein, its flexibility and usefulness is greatly increased. As pointed out a series or set of inserts can be provided which will simulate typical or average mandibular movements. Inserts can also be provided to simulate atypical movements and thus be useful to illustrate dental problems of occlusion or interference in the cusp-fossa relationship of the teeth.

The invention has been described with regard to specifically illustrated and preferred embodiments. It is not intended that this illustration and specific description of the invention be construed as unduly limiting of the invention. Instead, it is intended that the invention be defined by the elements and their obvious equivalents set forth in the following claims.

I claim:

1. A dental articulator having a lower frame with condylar members supported at each side of its posterior end and an incisal pin guide member supported on its longitudinal axis at its anterior, an upper frame having lateral wing members at its posterior projecting toward said condylar members and supporting, at its anterior, an incisal pin member in bearing relationship to said incisal guide member and fossa guide members carried by said wing members at fixed positions to provide a non-adjustable intercondylar distance and resting on said condylar members, each of said fossa guide members supporting a fixed and non-adjustable superior wall guide with a generally convex bearing surface oriented towards its respective condylar member and a fixed and non-adjustable medial wall guide with a bearing surface also oriented towards said condylar member, said bearing surfaces having a shape to present average anatomical pathways to their respective condylar members, and a posterior wall guide with means permitting the angular relationship of said posterior wall guide to said condylar member to be varied between more than one setting to thereby simulate variation in intercondylar distance.

2. The articulator of claim 1 wherein said posterior wall is adjustable between a forward position having an angle of about 10° to the condylar axis and a rearward position having an angle about 30° to said axis.

3. The articulator of claim 1 wherein the medial wall of each of said fossa guide members is spaced a slight distance inwardly of its condyle to provide an immediate lateral shifting of said frames.

4. The articulator of claim 3 wherein said superior wall bears a slight depression which registers with its condyle when said frames are in centric occlusion.

5. The articulator of claim 1 wherein said incisal pin guide member is a block bearing a semi-circular recess with a guide surface precontoured with an arcuate inclination.

6. The articulator of claim 5 wherein the chord of said arcuate inclination has an angle with the horizontal plane of the instrument of about 30°.

7. The articulator of claim 1 wherein said superior wall guide has an inclination from its inside to outside lateral edge of about 10°.

8. The articulator of claim 1 wherein said superior wall guide is a removeable insert and said fossa guide member bears means for the removeable attachment of said insert.

9. The articulator of claim 1 wherein said medial wall guide is a removeable insert and said fossa guide member has means for the removeable attachment of said insert.

10. The articulator of claim 1 wherein said frames support, at their mid portions and in opposed relationship, a pair of dental casts having teeth with working and occlusal surfaces which have predetermined contours to cooperate with said wall guides to demonstrate the relationship of said teeth contours and jaw movements.

11. The combination of the articulator of claim 10 with a series of pairs of said dental casts having predetermined and different contours providing harmonious and various discordant chewing and occlusal surfaces to thereby provide an instructional aid.

12. A dental articulator having a lower frame with condylar members supported at each side of its posterior end and an incisal pin guide member supported on its longitudinal axis at its anterior, an upper frame having lateral wing members at its posterior projecting toward said condylar members and supporting, at its anterior, an incisal pin member in bearing relationship to said incisal guide member and fossa guide members carried at outboard positions by said wing members and resting on said condylar members, each of said fossa guide members supporting superior, medial and posterior wall guide surfaces to their respective condylar members with a depression in the surface of the superior wall guide surface to mate with its condylar member when said frames are in centric orientation and thereby serve as a centric indexing means for said frames.

13. The articulator of claim 12 wherein said depression is in the surface of the superior guide wall surface.

14. The articulator of claim 12 wherein said medial wall guide surfaces are not in bearing relationship to said condylar members when said frames are in centric orientation to thereby permit an immediate lateral shifting of said frames.

* * * * *